Patented Oct. 21, 1924.

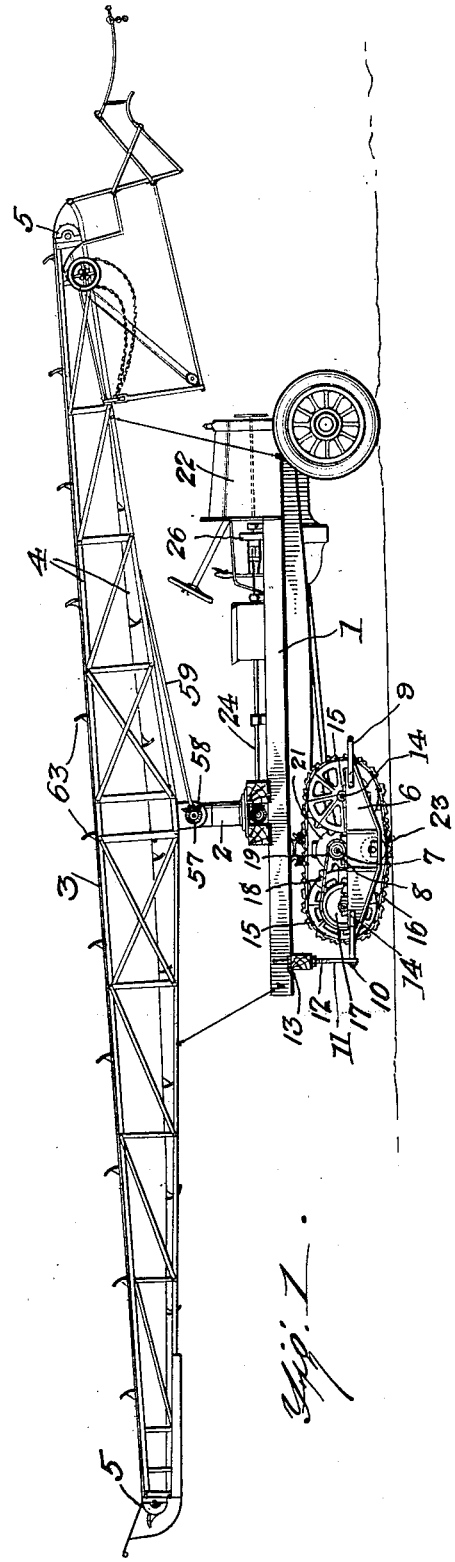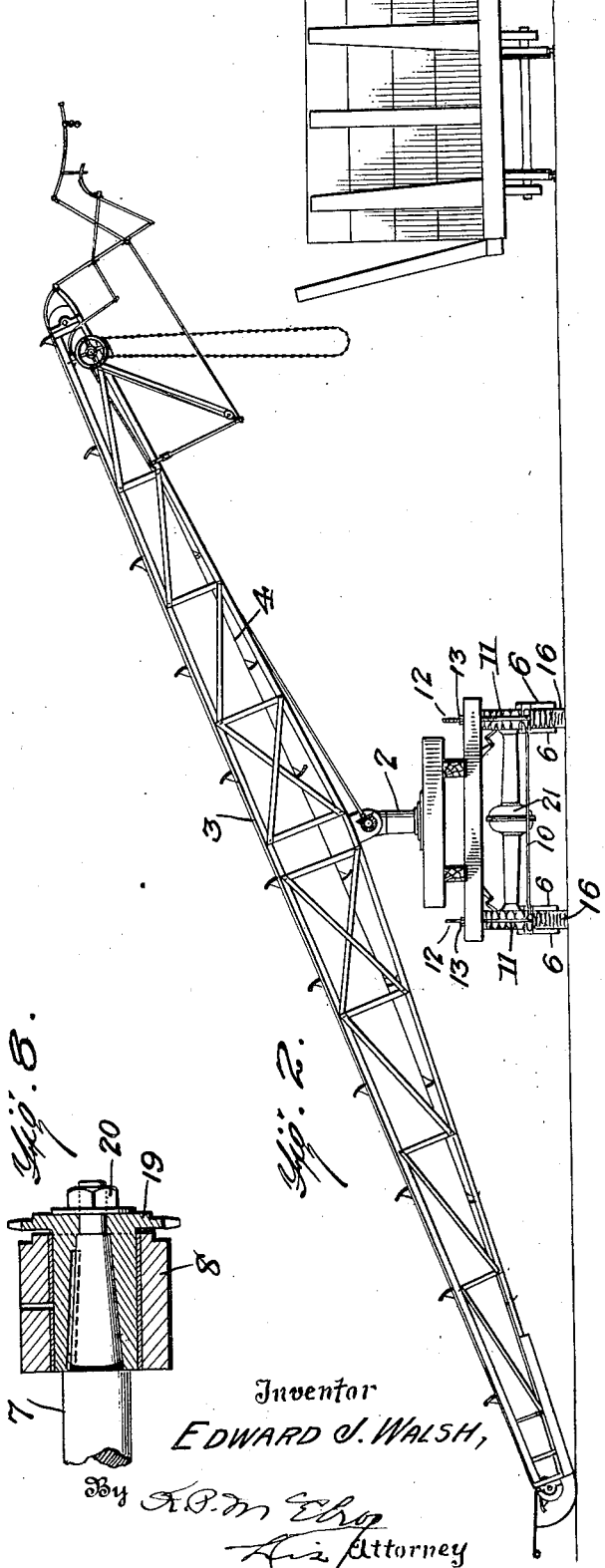

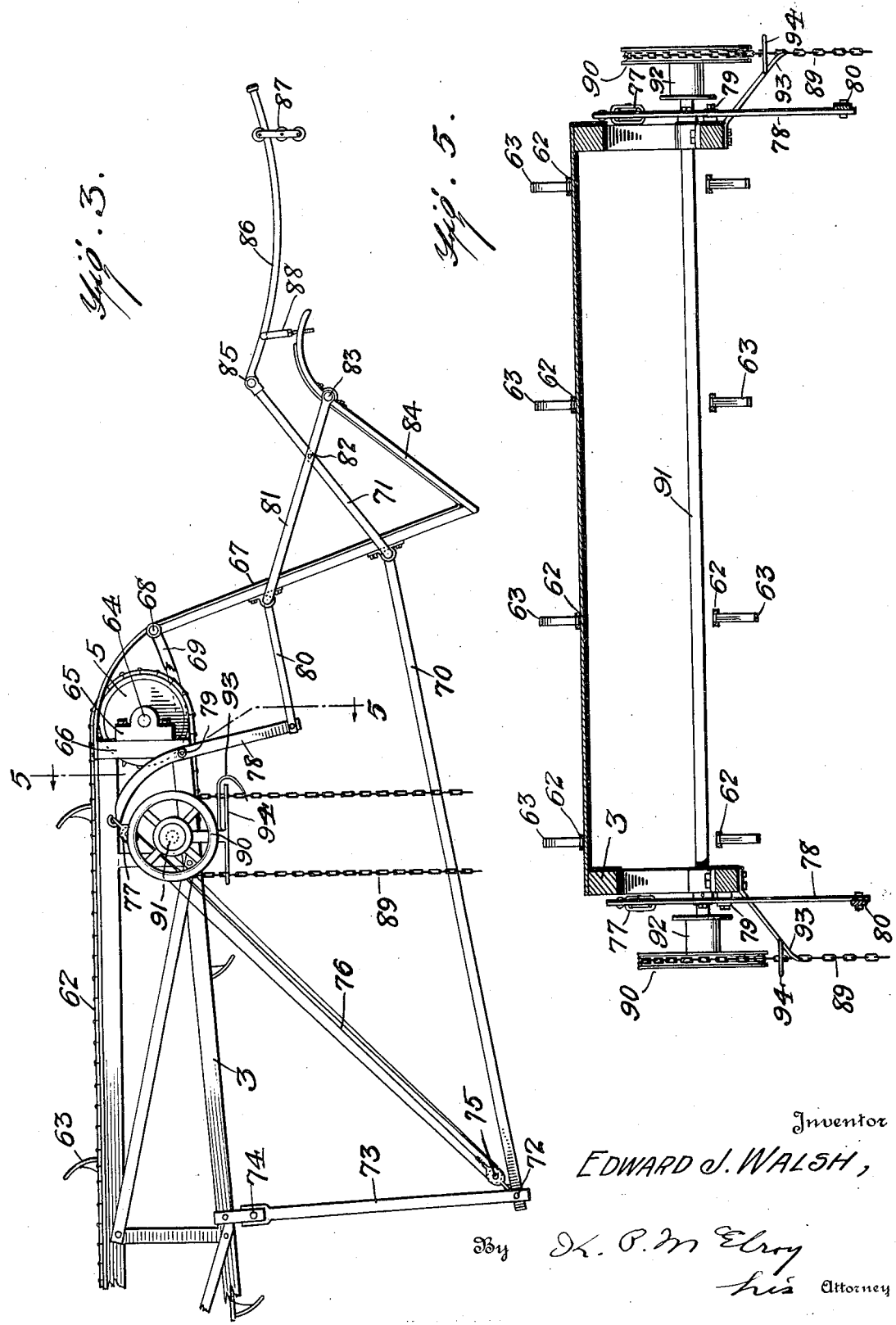

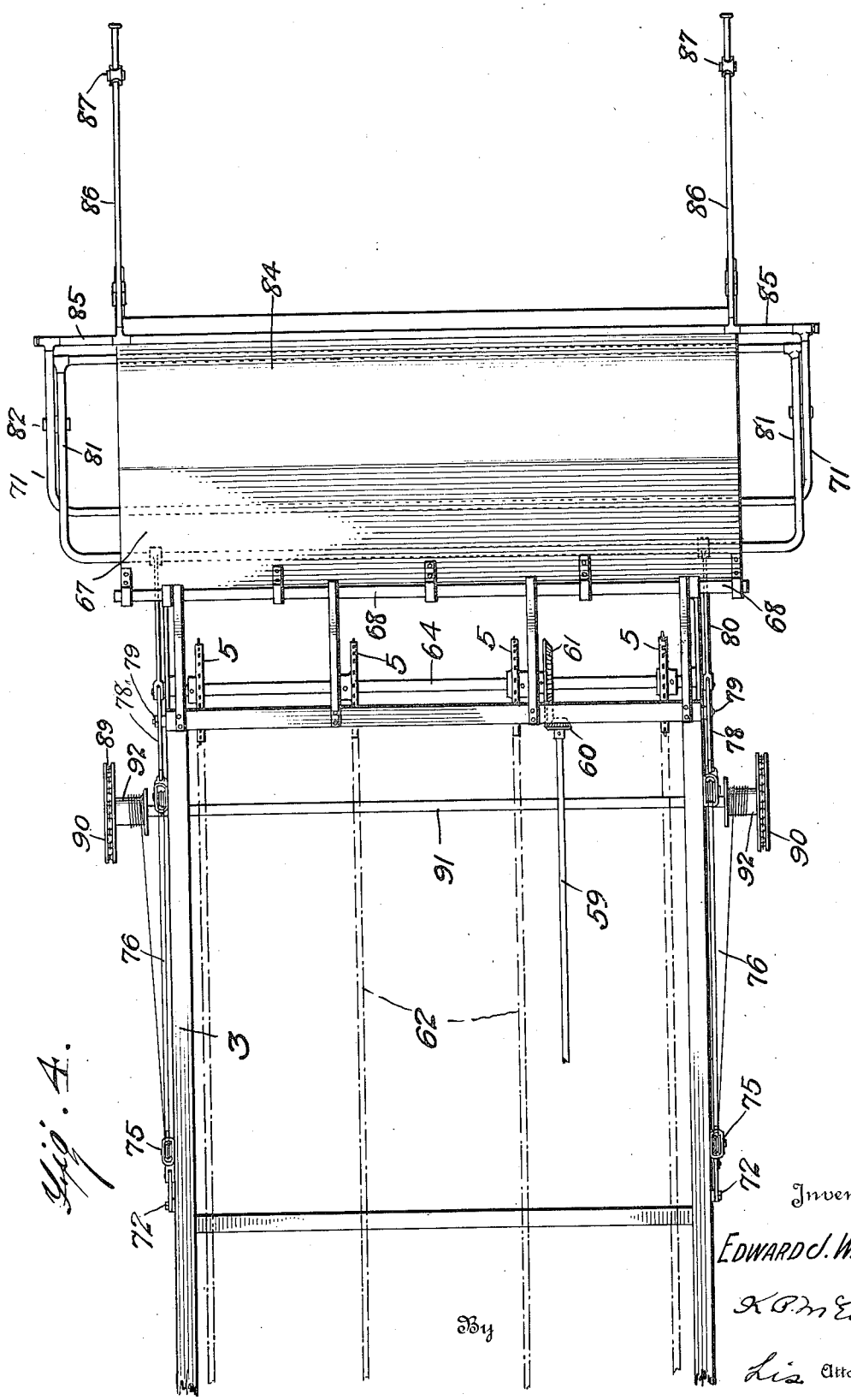

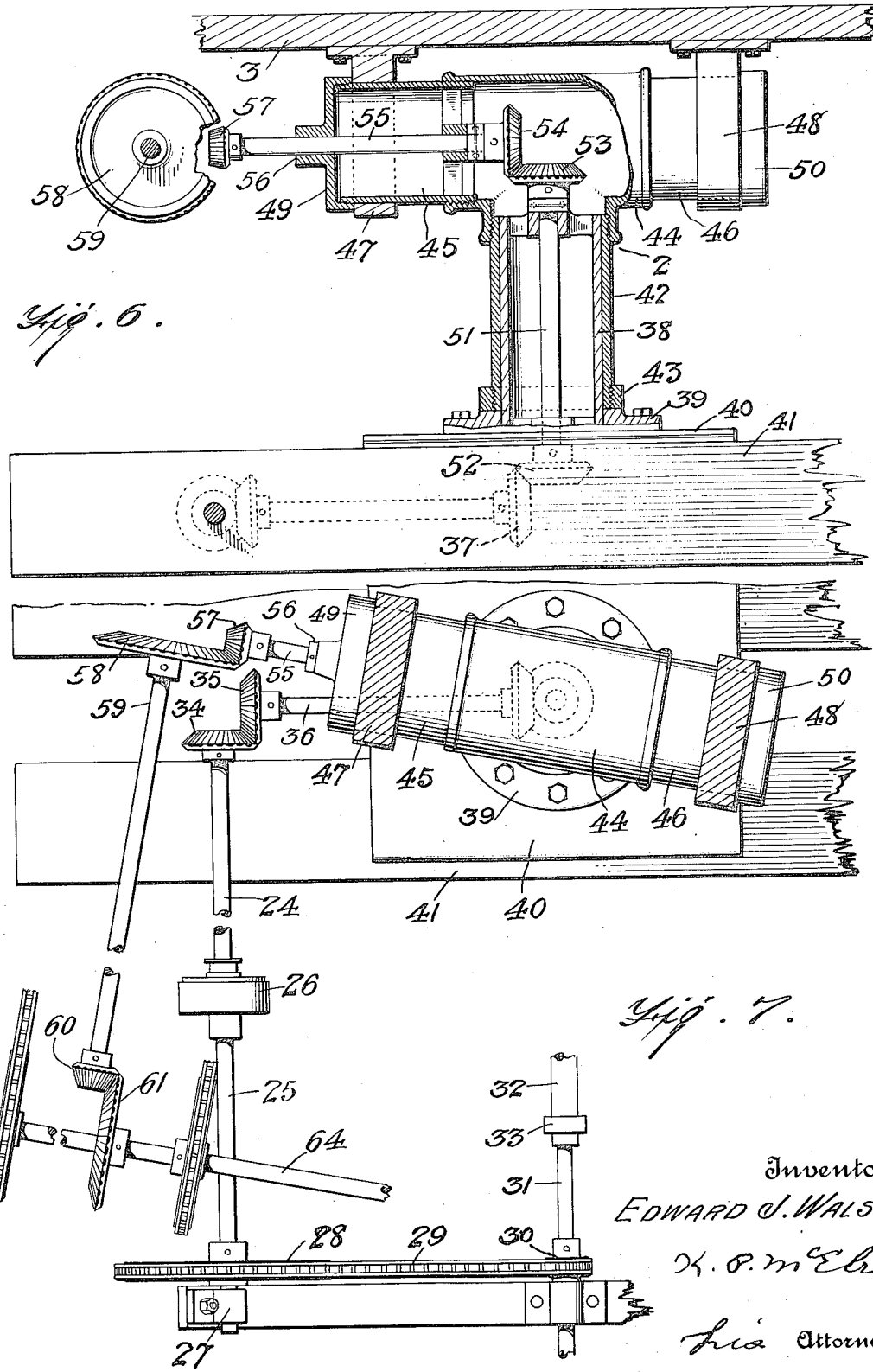

1,512,382

UNITED STATES PATENT OFFICE.

EDWARD J. WALSH, OF PUUNENE, TERRITORY OF HAWAII.

PORTABLE LOADING AND ELEVATING MACHINE.

Application filed September 25, 1922. Serial No. 590,479.

*To all whom it may concern:*

Be it known that I, EDWARD J. WALSH, a citizen of the United States, residing at Puunene, in the county of Maui and Territory of Hawaii, have invented certain new and useful Improvements in Portable Loading and Elevating Machines, of which the following is a specification.

This invention relates to loading machines for sugar cane and similar material; and particularly to a substantially automatic, portable or mobile machine of this type, simple in design and construction and economical to operate and maintain.

Heretofore the loading of sugar cane particularly, from the field into cars, has required a considerable amount of manual labor. The cane is ordinarily gathered up in bundles and carried by laborers to the cars to be loaded, this method of loading being slow and expensive as compared to one using a properly functioning automatic loader.

An object of the present invention is the provision of a practical loading machine, comprising a self-contained unit furnishing its own power for transporting the machine from place to place and for operating the conveyor mechanism when properly positioned with respect to the cut cane and the car to be loaded, whereby the cane will be properly elevated, conveyed and discharged into the car with the minimum amount of manual labor, in an economical manner and with a considerable saving of time.

A further object of the invention is the provision of means for surely and effectively moving the machine over soft, rough, or furrowed ground, and ditches, this being accomplished by the novel form of supporting and traction device for the entire machine, the whole arrangement being such that the motive power for driving the traction elements also furnishes power for the loading and conveying mechanism.

Another feature is the particular form of hopper mounted at the discharge end of the elevator or conveyor, whereby the cane or like materials will be evenly distributed into the cars.

Briefly stated the invention comprises a power driven mobile unit, consisting of a relatively light tractor or the like, which in an advantageous form is a truck of a known make, with the rear wheels removed substituted by a novel traction device of the endless track type, a chain and sprocket driving connection being used between the rear axle of the truck and the endless tracks, all of which will be described in more detail hereinafter.

Mounted adjacent the rear of a chassis of the truck or tractor, and supported thereby, is a hollow vertical standard provided with a hollow crosshead, having mounted for oscillatory movements thereon, a trussed framework structure supporting an endless flight conveyor, said conveyor traveling from end to end of the structure passing around the sprocket wheels carried by shafts journaled in the ends of said structure.

This standard or pedestal carrying with it the conveyor mechanism, is adapted to be rotated about its vertical axis and has enclosed therein an arrangement of gears and shafting forming a driving connection between the conveyor and power plant of the tractor, in a manner to be hereinafter more fully described.

The conveyor driving mechanism, being substantially of the differential type, permits the structure to be bodily manipulated without interfering with the power operated mechanism.

One end of the conveyor structure, which will be referred to as the lower end, is provided with a substantially rigid receiving hopper and the other, or upper end thereof, carries a discharging hopper, the construction of which being disclosed in the following detailed description taken in conjunction with the accompanying drawings in which:

Figure 1 is a view in side elevation of the complete machine in position to be transported, the elevator or conveyor being maintained in line with the supporting vehicle or tractor, by suitable guy lines as shown.

Fig. 2 is a view of the machine in operative position, the conveyor being turned preferably transversely to the supporting vehicle or tractor.

Fig. 3 is an enlarged detail view in side elevation of the discharging hopper and the upper end of the conveyor or elevator, and Fig. 4 is a top plan view thereof.

Fig. 5 is a vertical sectional view on line 5—5 of Fig. 3.

Fig. 6 is an enlarged detail view, partly in section and partly in elevation, illustrating the construction of the supporting pedestal and associated mechanism for manipulating and operating the elevator or conveyor respectively.

Fig. 7 is a plan view of said mechanism, parts being broken away, illustrating the driving connections between the power mechanism and the conveyor housed within the pedestal.

Fig. 8 is a detail sectional view of one end of the axle extending from the differential drive of the tractor providing the means whereby the driving power is transmitted to the endless tracks or traction elements.

Referring to the drawings in detail, the improved apparatus comprises generally, a tractor 1 carrying a rotatable standard 2 having mounted thereon an oscillatory and rotary trussed framework structure 3, provided with an endless flight conveyor 4 supported between sprockets or the like 5 journaled in the extreme opposite ends of said framework structure 3; the whole adapted to be transported as a unit from place to place as required during the loading operations.

Owing to the usual rough character of the field over which it is necessary for the machine to travel in performing its work, the ordinary traction or driving wheels of the conventional truck used, are obviously inadequate, although the remaining mechanism thereof, has been found to be admirably suited to the purpose. To overcome this traction difficulty, in the present invention, it is proposed to mount the rear of the chassis of the truck 1 on an endless track structure in lieu of the usual wheels. This endless track structure comprises two pairs of side frame members 6 supporting the opposite ends of the rear axle 7 in journals 8 positioned on the upper intermediate portions of said side frames 6. The forward and after ends of said side frames are connected by cross bars or tie rods 9 and 10 respectively for maintaining the side frames in general alignment. The rear ends of the side frames are, in addition, connected to the after end of the chassis of the truck 1 by vertically adjustable rods or the like 11, preferably provided with threads 12 and lock nuts 13 to accomplish this purpose.

Mounted in journals 14 between the respective pairs of side frames 6 are two relatively large sprocket wheels 15 carrying endless tracks or similar ground engaging elements 16.

One of the sprocket wheels 15 of each pair, preferably the rear one, has secured thereto a driven sprocket 17 of the proper size to give the desired speed, connected by a chain 18 to the driving sprocket 19 keyed to the tapered end of the axle 7, said sprocket 19 being held in this position by a lock nut 20 as more clearly shown in Fig. 8.

It is of course to be understood, that, the opposite ends of the axle 7, carrying the driving sprockets 19, extend from the customary differential and axle housing 21 of the truck, said axle being driven in the well known manner from the power plant located under the hood 22 at the forward end of said truck.

Also journaled between the respective pairs of side frames 6, in the lower intermediate portions thereof, is roller 23 in position to engage and press downwardly, below the lower edges of the sprocket wheels 15, the lower reach of the endless track 16.

With the above arrangement, when the tractor is passing over relatively smooth ground during the manipulation of the conveyor 3, the side frames 6 of the endless track arrangement, can be lowered at the rear to obtain a relatively long and flat ground-engaging surface, this adjustment being accomplished by the vertical movements of the rods 11. On the other hand, in traveling over ditches, deep furrows or other uneven ground, it is advisable to have the side frames 6 adjusted to the horizontal position, whereby the whole arrangement will be supported upon the rollers 23, having substantially a single point of contact with the ground. Under these conditions, the traction elements will not only have proper engagement with the ground, but the entire loading mechanism may be readily and easily turned around and manipulated, functioning as a whole, in a manner similar to a vehicle with ordinary wheels and at the same time keeping intact the power driven connections. This facilitates the control of the machine by the operator as well as reduces strain on the working parts.

In addition to furnishing the necessary power for transporting the conveying and loading mechanism, a driving arrangement is provided, connected to the power plant for operating the conveyor 4 without disconnecting or interfering in any way, with the traction driving connections.

This supplemental driving arrangement (see Figs. 6 and 7) comprises an auxiliary driven shaft 24 adapted to be connected to its driving shaft 25 by a friction clutch 26 located adjacent the operator's seat, the forward end of said shaft 25 being journaled at 27 in the forward cross member of the chassis of the truck or tractor 1. Just back of the journal 27, the shaft 25 is provided with a sprocket wheel 28 carrying a chain 29 running to a smaller sprocket wheel 30 secured to a stub shaft 31 connected to the end of the crank shaft 32 of the main power plant by a coupling 33, which coupling may be of such form as to serve also as a fan belt pulley.

The inner end of the auxiliary driven shaft 24, extends rearwardly to a point adjacent the pedestal 2 supporting the conveyor mechanism and this end of the shaft is provided with a beveled gear 34 meshing with a similar gear 35 carried by a countershaft 36 arranged at right angles thereto and terminating just below the base of the pedestal 2.

As clearly shown in Fig. 6 the pedestal 2 comprises a hollow standard 38 having a base 39 secured to a plate 40 supported upon cross members 41 mounted on the rear portion of the chassis of the truck or tractor. Rotatably positioned about the standard 38 is a cylinder 42 having an enlarged lower end bearing 43 and having secured to its upper end a hollow T-coupling member 44, the opposite ends thereof supporting relatively short tubular sections 45 and 46. These sections 45 and 46 comprise the pivotal supports for the encircling brackets 47 and 48 carrying the frame-work structure 3 of the conveying and loading mechanism. These brackets are maintained in proper position by head sections 49 and 50 threaded onto the outer ends of the tubular sections 45 and 46 respectively.

The pedestal 2 not only acts as a rotatable and oscillatory support for the conveyor mechanism, but also has journaled therein a concentrically positioned vertical shaft 51 having secured at its lower end a beveled gear 52 meshing with the gear 37, associated with the auxiliary driving mechanism above referred to. The upper end of the shaft 51 carries a beveled gear 53 positioned to mesh with a similar gear 54 keyed to a horizontal shaft 55 concentrically mounted within, and extending outwardly from the tubular extension 45, the head sections 49 being provided with a centrally located opening forming a bearing for the outer end of said shaft 55. The outer end of that portion of the shaft 55 extending without the head section 49, carries a small beveled gear 57, positioned to engage a larger beveled gear 58 secured to the lower end of a shaft 59 extending upwardly, beneath the conveyor supporting structure of framework 3, to supply the necessary power for operating the loading conveyor, through intermeshing gears 60 and 61, the details of which will be hereinafter more fully described.

The above described arrangement of gearing within the pedestal 2, permits the horizontal rotation and vertical oscillation of the conveyor mechanism per se, without interfering with the continuous operation of the gearing. The said arrangement acts as a differential, a support for the loading conveyor mechanism and also as a means of transmitting power so that the conveyor may be pivotally inclined, upwardly or downwardly, and swung around in a complete circle, all or any of said movements capable of being performed while the conveyor mechanism is in operation or at a stop, and also while the entire unit is either moving forward or backward, or is at rest.

As hereinbefore stated, the trussed framework structure 3 supports between its opposite ends an endless conveyor 4 comprising preferably a series of parallel chains or the like 62 carrying spaced hook-like members 63, more clearly shown in Figs. 3, 4, and 5. These chains 62 are adapted to run over the sprockets 5 mounted on shafts 64 journaled in bearings 65 secured to cross members 66 connecting the extreme ends of the structure 3, one of said shafts 64, preferably the one at the upper end of the structure 3, carrying the beveled gear 61 above referred to, whereby the necessary driving power is transmitted to the endless conveyor.

Mounted on the upper discharge end of the structure 3, is an automatic receiving and dumping hopper or the like for evenly and properly distributing the material into the cars being loaded. This comprises a deflecting table 67 hinged to a transverse shaft 68 supported by bracket arms 69 attached to each side of the upper end of the conveyor supporting structure 3. The table 67 is regulated as to deflection by oppositely disposed lever arms 70 pivotally connected at their outer ends to the intermediate portion of a U-shaped member 71, carried by the deflecting table 67, each lever arm 70 extending rearwardly to a hinged joint 72 supported by a link 73 pivotally connected at 74 to the structure 3. Secured to the joint 72 is a pulley 75 which operates by means of a wire rope or chain 76, with a pulley 77 attached to the upper end of a secondary lever 78 pivoted at 79, acting as an additional lift or purchase for the deflecting table 67, the lower end of said secondary lever being pivoted to a lever arm 80 which is in turn hinged to the intermediate portion of a second U-shaped member 81 also carried by the deflecting table 67.

The upwardly and downwardly projecting legs of the U-shaped members 71 and 81 respectively are crossed and pivotally connected at 82, the lower ends of the legs of the member 81 being connected together by a transverse shaft 83 to which is pivotally hung the displaceable or dumping side 84 of the hopper, formed by said side 84 and the deflecting table 67. The upper ends of the legs of the U-shaped member 71 are likewise connected together by a transverse rod 85 on which are hingedly mounted two curved arms 86, each supporting a rolling weight 87. The upper side edges of the dumping side 84 of the hopper are connected to the curved arms 86 by extensible or adjustable links 88, the points of connection of the links 88 with the arms 86 being located out beyond the pivotal connections 85 of said arms 86.

As means by which the hopper is regulated as to deflection for the even disposition of the material on the loading cars, through the system of links and levers just described, there are provided two hand chains 89 each running around a sprocket wheel 90 secured to the opposite ends of the shaft 91, said shaft carrying adjacent each sprocket a drum 92 for winding thereon the free ends of the ropes or cables 76. Each hand chain 89 is held in any of its adjusted positions by an engaging finger 93 attached to a chain guide 94.

By pulling either of the chains 89 in either direction, the cables or ropes 76 will be wound onto, or unwound from the drums 92, thereby drawing together or allowing the separation of the levers 78 and the pivot points 72. This results in a corresponding deflection of the table 67 in an obvious manner.

The hopper being equipped with a duplicate of this device on each side, it is possible to disengage the holding chain 89 by a slight pull downwardly, which will relieve the upward strain and allow the chain to slip clear of the fingers 93. The purpose or feature of this is that should the chain be hooked fast on one side, it would not be necessary to be on that particular side to release it. Again, it is advisable, especially in the loading of sugar cane, for the laborer who may be attending to the loading, to operate the hopper deflecting mechanism from the top of the loaded cane. With this device he may do this equally well on one side of the conveyor as on the other, or he may operate it from the ground in the same manner, as occasion may demand.

By reason of the curved arms, rolling weights and associated connections, the dumping side 84 will be caused to function when a predetermined amount of material has been deposited in the hopper from the conveyor. The rolling counterweights 87 shifts its position as the hopper is raised or lowered, thereby decreasing or increasing the pressure on the fulcrum. As the center of gravity is changed, by raising or lowering the deflecting table 67, the materials which are in the hopper exert a corresponding variation of pressure against the dumping side 84. As a means to counteract or equalize this variance of pressure as the center of gravity moves forward or recedes in relation to the center of the hopper, the rolling counterweight 87 has been devised. This weight runs on the curved arm 86 having the proper curvature and so designed that plus the counterweight 87 it will trip upon a certain pressure being exerted at the base of the dumping side 84. It will be noted that an equal and continuous pressure will be maintained on the fulcrum by the rolling counterweight while the hopper is closed. A very important feature of this device is the ability in itself to close while the hopper may be set at any angle of deflection. The adjustment as to the weight desired for tripping the hopper, is made by the screw at the end of the links 88 which increases or decreases the leverage against the fulcrum and thus increases or decreases the amount of strain required to trip. It will be noted that a slight opening of the hopper causes the rolling counterweight 87 to shift quickly, thereby facilitating the sudden trip which is desired, and again this weight has a tendency to counterbalance the dumping side 84 preventing it from closing with a rush until the material has been dropped.

By reason of the particularly designed hopper construction as above described, three features are brought into effect, to wit, to cause the sugar cane or the like to lay in a general horizontal position, to hold in place and dump a predetermined amount of cane, and to close after being free from the load, all of said operations being automatic.

From the foregoing description of the complete conveying and loading machine, it will be apparent that a simple and compact mobile unit has been devised, capable of transporting itself to the desired place of loading without the usual necessity of laying tracks, and that obvious desired results have been obtained by the means of mounting the conveyor or loading mechanism per se so that the same can be manipulated with respect to the bodily adjustments of the conveyor supporting structure, and the operation of the conveyor or loading mechanism can be performed by the same power plant used for transporting the complete unit, both of said power actuated mechanism being capable of operation simultaneously or at different times as desired, without any interference with each other whatsoever.

What I claim is:

1. In a loading machine, the combination with a motor vehicle, of an elevating conveyor and a dumping hopper carried thereby, means for permitting the rotation and oscillation of said conveying and dumping mechanism, means for permitting the individual bodily movement of said hopper toward and away from the conveyor, power mechanism for operating said conveyor, said mechanism deriving its power from the power plant of the vehicle, and means for connecting and disconnecting, at will, said mechanism and power plant.

2. In a loading machine, the combination with a motor vehicle, of an elevating conveyor and dumping mechanism, a standard supporting the conveyor and dumping mechanism on said vehicle, said standard being constructed to permit a rotation and oscillation of said conveyor and dumping mechanism and power operated means associated with said standard for operating said conveyor.

3. In a loading machine, the combination with a motor vehicle, of an elongated framework structure, an elevating conveyor and dumping mechanism supported thereby, a vertical standard mounted on said vehicle, means for pivotally supporting the framework structure on said standard, and power operated transmission mechanism associated with said standard for operating said conveyor.

4. In a loading machine, the combination with a motor vehicle, of an elongated framework structure, an elevating conveyor and dumping mechanism supported thereby, a vertical standard mounted on said vehicle adapted to be rotated about its vertical axis, a crosshead carried by said standard, means for pivotally supporting the framework structure on said crosshead and power operated transmission mechanism associated with said standard for operating said conveyor.

5. In a loading machine, the combination with a motor vehicle, of an elongated framework structure, an elevating conveyor and dumping mechanism supported thereby, a hollow vertical standard mounted on said vehicle adapted to be rotated about its vertical axis, a hollow crosshead secured to the upper end of said standard, means for pivotally supporting the framework structure on said crosshead, a differential transmission mechanism housed within said standard and crosshead, means for connecting said transmission mechanism to the conveyor mechanism to operate the same, and power operated means for said transmission.

6. In a loading machine, the combination with a motor vehicle, of an elongated framework structure, an elevating conveyor and dumping mechanism supported thereby, a hollow vertical standard mounted on said vehicle adapted to be rotated about its vertical axis, a hollow crosshead secured to the upper end of said standard, means for pivotally supporting the framework structure on said crosshead, a differential transmission mechanism housed within said standard and crosshead, means for connecting the upper end of said transmission mechanism to the conveyor for operating the same, means for connecting the lower end of the transmission mechanism to the power plant of the vehicle and a clutch interposed between the last mentioned means and the power plant.

7. In a loading machine, the combination with a vehicle, of an elevating conveyor mechanism, a receiving hopper at the lower end of said conveyor, a discharging hopper at the upper end of said conveyor, and means for bodily shifting the position of said discharge hopper relative to the conveyor.

8. In a loading machine, the combination with a vehicle, of an elevating conveyor mechanism, a receiving hopper at the lower end of said conveyor, a discharging hopper pivotally connected to the upper end of said conveyor and a series of pivoted links and levers for extending and retracting the discharging hopper relative to the adjacent end of the conveyor and means for operating said links and levers.

9. In a loading machine, the combination with a vehicle, of an elevating conveyor mechanism, a receiving hopper at the lower end of said conveyor, a discharging hopper pivotally connected to the upper end of said conveyor, a displaceable side carried by said hopper whereby the contents directed into said hopper may be discharged and a counterbalancing mechanism associated with said displaceable side for automatically controlling the operation of said displaceable side upon the depositing of a predetermined amount, by weight, of material into said hopper.

10. In a loading machine, the combination with a vehicle, of an elevating endless conveyor mechanism, a receiving hopper at the lower end of said conveyor, a discharging hopper at the upper end of said conveyor, means for operating said conveyor for carrying the material being loaded from the receiving hopper to the discharging hopper and means for bodily shifting the position of said discharging hopper relative to the conveyor during the loading operation.

11. In a loading machine, the combination with a motor vehicle, of an elevating endless conveyor mechanism, a receiving hopper at the lower end of said conveyor, a discharging hopper at the upper end of said conveyor, power operated means connected to the power plant of the vehicle for operating said conveyor, manually operated means for shifting the position of said discharging hopper, relative to the conveyor and car being loaded during the loading operation, and counterbalancing mechanism for automatically dumping said hopper upon the depositing of a predetermined amount, by weight of material into said hopper.

In testimony whereof, I have hereunto affixed my signature.

EDWARD J. WALSH.